(12) United States Patent
Patel

(10) Patent No.: US 9,527,619 B2
(45) Date of Patent: Dec. 27, 2016

(54) BIODEGRADABLE PHARMACY CONTAINER AND SAFETY CAP

(75) Inventor: Shantu Patel, Carlsbad, CA (US)

(73) Assignee: Innovative Bottles, Inc., Carlsbad, CA (US)

( * ) Notice: Subject to any disclaimer, the term of this patent is extended or adjusted under 35 U.S.C. 154(b) by 830 days.

(21) Appl. No.: 13/270,573

(22) Filed: Oct. 11, 2011

(65) Prior Publication Data

US 2012/0138503 A1    Jun. 7, 2012

Related U.S. Application Data

(63) Continuation of application No. PCT/US2010/060794, filed on Dec. 16, 2010, which is
(Continued)

(51) Int. Cl.
*B65D 85/84* (2006.01)
*B65D 50/04* (2006.01)
(Continued)

(52) U.S. Cl.
CPC ........... *B65D 1/0215* (2013.01); *B65D 50/046* (2013.01); *B65D 65/46* (2013.01); *C08F 2/50* (2013.01);
(Continued)

(58) Field of Classification Search
CPC .... C08J 2367/04; C08J 2300/16; B65D 65/45; B65D 41/0414; B65D 41/0471; B65D 50/02; B65D 50/04; B65D 50/045; B65D 50/046; B65D 50/048; Y10S 215/901; C08K 5/103
(Continued)

(56) References Cited

U.S. PATENT DOCUMENTS 3,917,097 A * 11/1975 Uhlig ............................ 215/216
5,706,963 A *  1/1998 Gargione ............. B65D 50/046
                                                        215/217
(Continued)

FOREIGN PATENT DOCUMENTS

JP        2004161802 A  *  6/2004

OTHER PUBLICATIONS

Modern Plastics; Harper, Charles A. (2000). Modern Plastics Handbook.. McGraw-Hill. Online version available at: http://www.knovel.com/web/portal/browse/display?_EXT_KNOVEL_DISPLAY_bookid=1008&VerticalID=0.*
(Continued)

*Primary Examiner* — Lee Sanderson
(74) *Attorney, Agent, or Firm* — Fred C. Hernandez; Mintz Levin Cohn Ferris Glovsky and Popeo, P.C.

(57) ABSTRACT

A biodegradable pharmacy container and safety cap includes a biodegradable material that includes a bioplastic resin and a plasticizer; a container that includes the biodegradable material, adapted to store medicine; a first locking element on an exterior side of the container; a cap that includes the biodegradable material; a resilient inner member in the cap that engages with the container so as to form a seal; a second locking element in the cap that cooperates with the first locking element so that the cap is safely held to the container. The bioplastic resin may be polylactic acid (PLA), PHA, PHB, or PHBH. The acrylate may be cured with ultraviolet light, and may include a silicone.

7 Claims, 14 Drawing Sheets

Related U.S. Application Data a continuation-in-part of application No. PCT/US2010/031887, filed on Apr. 21, 2010, and a continuation-in-part of application No. 12/709,496, filed on Feb. 21, 2010, now Pat. No. 8,519,018, which is a continuation-in-part of application No. 12/603,395, filed on Oct. 21, 2009, now abandoned.

(51) Int. Cl.
*B65D 55/02* (2006.01)
*B65D 1/02* (2006.01)
*B65D 65/46* (2006.01)
*C08F 2/50* (2006.01)
*C08J 7/18* (2006.01)
*C08F 222/10* (2006.01)

(52) U.S. Cl.
CPC ............ *C08J 7/18* (2013.01); *C08F 222/1006* (2013.01); *C08J 2300/16* (2013.01); *C08J 2367/04* (2013.01); *C08J 2433/06* (2013.01); *Y02W 90/12* (2015.05); *Y02W 90/13* (2015.05)

(58) Field of Classification Search
USPC ....... 215/21–225; 428/34.1, 35.7; 206/524.7; 220/290, 345.2, 345.3, 350
See application file for complete search history.

(56) References Cited

U.S. PATENT DOCUMENTS

| | | | | |
|---|---|---|---|---|
| 5,865,330 A * | 2/1999 | Buono | ............... | B65D 50/046 215/216 |
| 5,908,125 A * | 6/1999 | Opresco | ............... | B65D 50/046 215/216 |
| 6,036,036 A * | 3/2000 | Bilani | ............... | B65D 50/046 215/216 |
| 6,112,921 A * | 9/2000 | Robinson | ............... | 215/216 |
| 6,168,035 B1 * | 1/2001 | McLelland | ............... | B65D 50/046 215/216 |
| 6,279,766 B1 * | 8/2001 | Jones | ............... | B65D 50/046 215/216 |
| 6,736,898 B2 | 5/2004 | Schrof | | |
| 7,279,205 B2 | 10/2007 | Huffer | | |
| 7,422,780 B2 | 9/2008 | Suzuki | | |
| 7,569,619 B2 | 8/2009 | Esaki | | |
| 2005/0236354 A1 * | 10/2005 | Miceli et al. | ............... | 215/228 |
| 2007/0034589 A1 * | 2/2007 | Zeide | ............... | 215/222 |
| 2007/0267304 A1 * | 11/2007 | Portier | ............... | 206/204 |
| 2009/0047531 A1 * | 2/2009 | Bartley et al. | ............... | 428/515 |
| 2009/0162683 A1 * | 6/2009 | Douard | ............... | 428/480 |
| 2009/0226655 A1 | 9/2009 | Sugai | | |

OTHER PUBLICATIONS

Doi, Y., and Kazuhiko Fukuda. Biodegradable Plastics and Polymers: Proceedings of the Third International Scientific Workshop on Biodegradable Plastics and Polymers, Osaka, Japan, Nov. 9-11, 1993. Amsterdam: Elsevier, 1994. Print. pp. 24-25.*

* cited by examiner

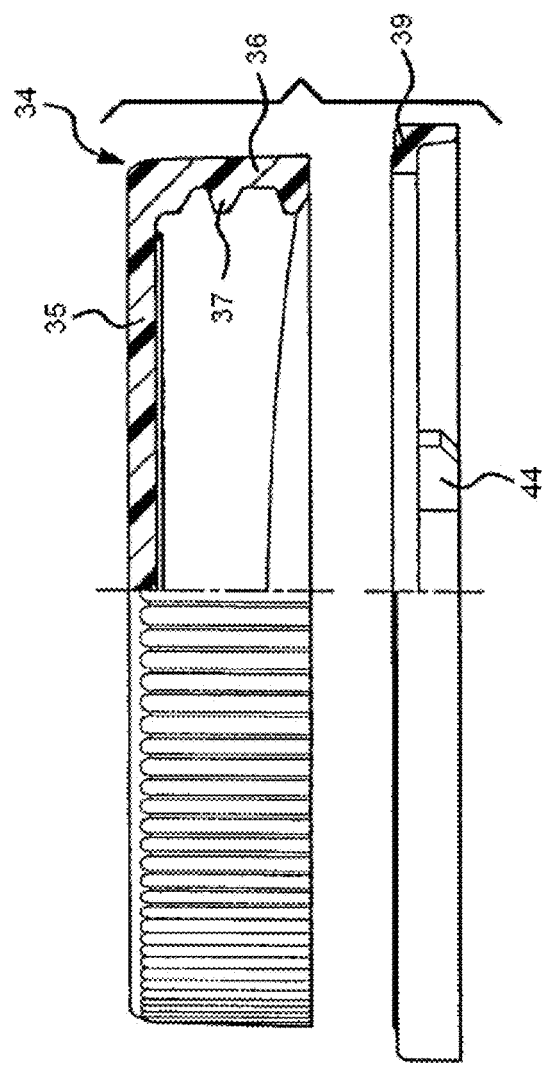

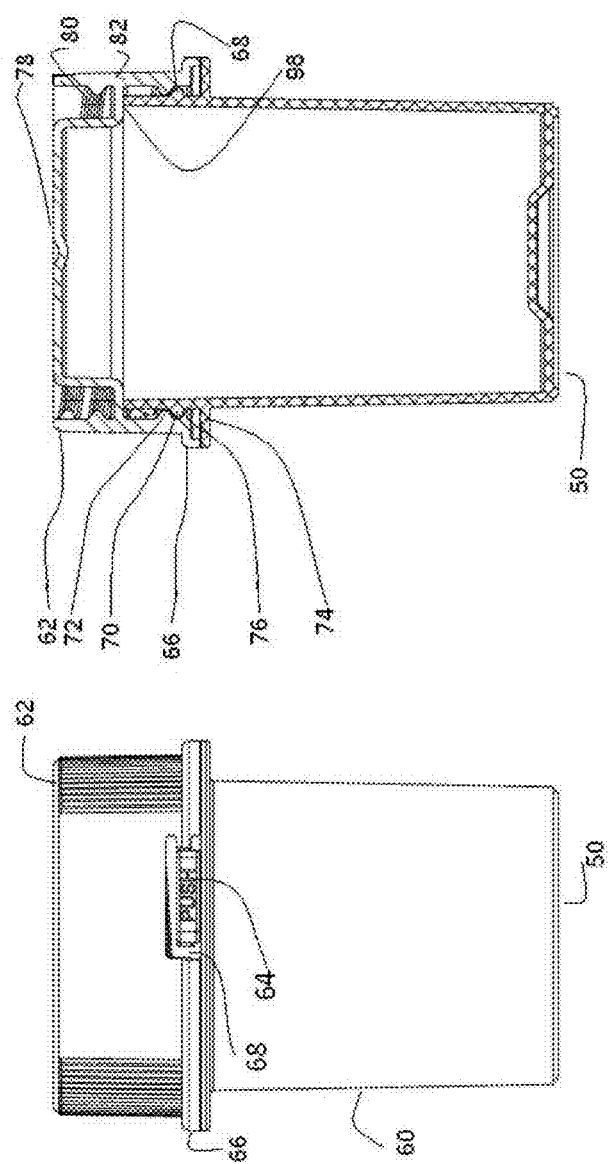

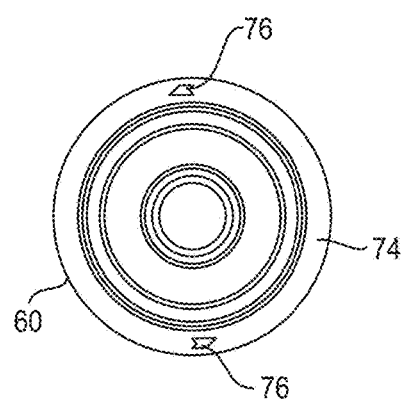
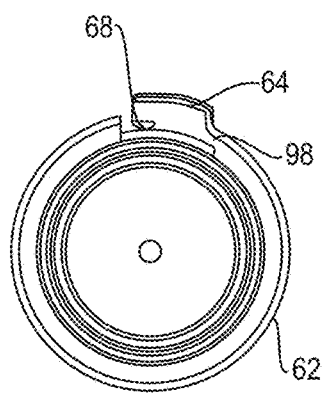
FIG. 14A  FIG. 14B
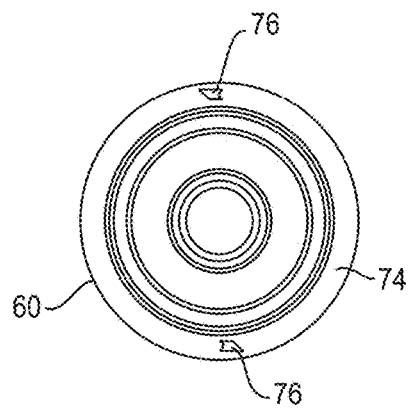
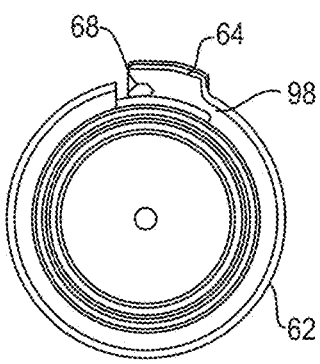
FIG. 14C  FIG. 14D

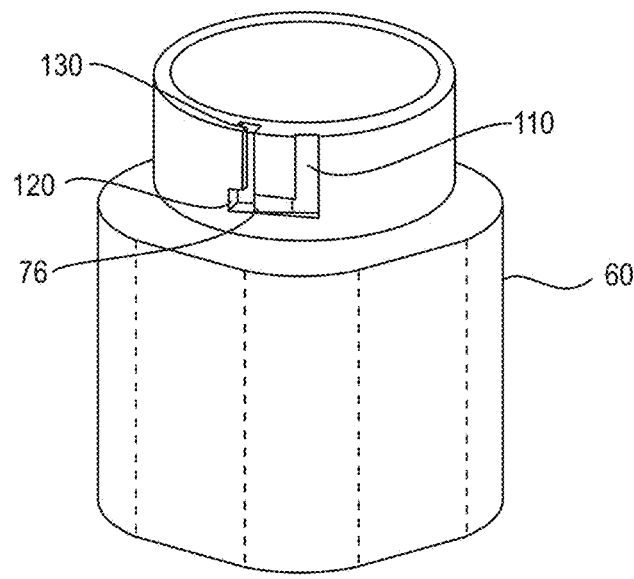
FIG. 19
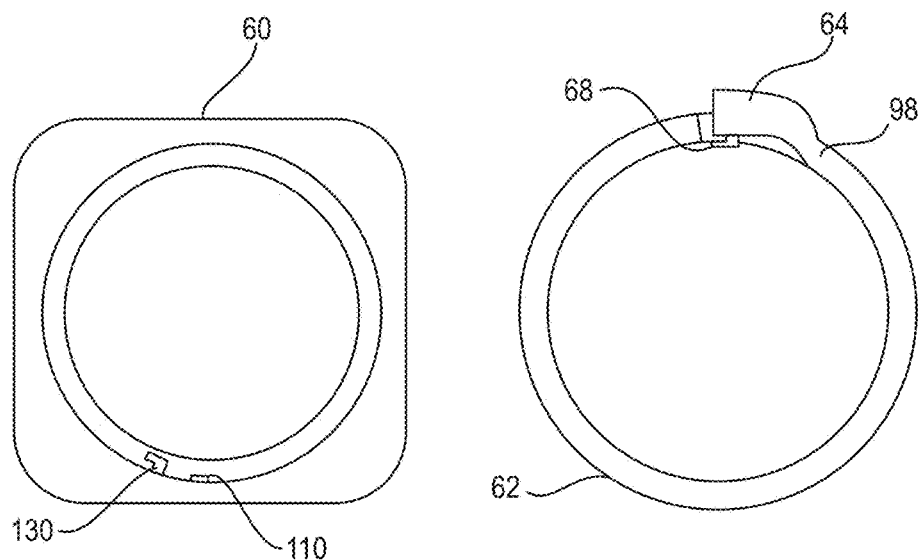
FIG. 20
FIG. 21

BIODEGRADABLE PHARMACY CONTAINER AND SAFETY CAP

RELATED APPLICATIONS

This application claims the benefit of the filing date of U.S. patent application Ser. No. 12/603,395, filed Oct. 21, 2009, which is incorporated herein by reference in its entirety, U.S. patent application Ser. No. 12/709,496, filed Feb. 21, 2010, which is incorporated herein by reference in its entirety, and International Patent Application Number PCT/US2010/031887, filed Apr. 21, 2010, which is incorporated herein by reference in its entirety, and International Patent Application Number PCT/US2010/060794, filed Dec. 16, 2010, which is incorporated herein by reference in its entirety.

BACKGROUND OF THE INVENTION

The present invention generally relates to pharmacy containers, and more specifically to a biodegradable pharmacy container and safety cap.

Currently, pharmacy containers are made from plastic, such as poly propylene, are lightweight, can be molded easily at low cost, and are widely used, but plastic has negative environmental impacts. Propylene and other plastics are derived from petroleum, or are otherwise fossil fuel based, which is not readily biodegradable, nor renewable or sustainable, and has a large carbon footprint.

A "bioplastic" can be biodegradable, and is shaped by being formed, molded or extruded into a desired shape.

Biodegradable products may be made from paper or bioplastic, and from biodegradable or bioplastic resins. Bioplastic resins may include polyhydroxyalkonate (PHA), poly 3 hydroxybutrate co 3 hydroxyhexanote (PHBH), polyhydroxybutyrate-co-valerate (PHB/V), poly-3-hydroxybutyrate (PHB), chemical synthetic polymer such as polybutylene succinate (PBS), polybutylene succinate adipate (PBSA), polybutylene succinate carbonate, polycaprolactone (PCL), cellulose acetate (PH), polylactic acid/chemical synthetic polymer such as polylactic polymer (PLA) or copoly-L-lactide (CPLA), and naturally occurring polymer, such as starch modified PVA+aliphatic polyester, or corn starch.

Bioplastics are plant based and are compostable, thus biodegradable, and are from a renewable, sustainable resource, which has a lower carbon foot print than ordinary plastic. For these reasons bioplastics are more environmentally friendly than plastic.

The United States Pharmacopeial Convention has established requirements for containers which are described in many of the drug product monographs in The United States Pharmacopeia/National Formulary (USP/NF). For capsules and tablets, these requirements generally relate to the design characteristics of the container, e.g., tight, well-closed or light-resistant.

The Food and Drug Administration (FDA) has requirements for tamper-resistant closures and the Consumer Product Safety Commission (CPSC) has requirements for child-resistant closures. For capsules and tables, these requirements generally require containers that are tight, well-closed or light-resistant. A packing systems should protect the dosage form, be compatible with the dosage form, and should be composed of materials that are considered safe for use with the dosage form (e.g. generally nontoxic).

To be suitable for storing medicine, a pharmacy container closure system must provide adequate protection from temperature and light that can cause a degradation in the quality of the dosage form over its shelf life. Common causes of such degradation are exposure to light, loss of solvent, exposure to reactive gases (e.g. oxygen), absorption of water vapor, microbial contamination, or contamination by filth. Solid oral dosage forms generally need to be protected from the potential adverse effects of water vapor. Protection from light and reactive gases may also be needed. For example, the present of moisture may affect the decomposition rate of the active drug substance or the dissolution rate of the dosage form. The container should have an intrinsically low rate of water vapor permeation, and the container closure system should establish a seal to protect the drug product.

Clear or translucent grade silicone liquid rubber or plasma, that is hypoallergenic, may be used in a variety of applications. Silicone characteristics include superb chemical resistance, high temperature performance, good thermal, long-term resiliency, and easy fabrication. It also possesses excellent UV resistance. This material may be low volatile, peroxide free and does not discolor over time. Silicone is odorless, tasteless, chemically inert and non-toxic. It may meet standards developed by US Pharmacopeia and offer FDA approved ingredients, including low compression set and fungus resistance.

It would therefore be desirable to provide a pharmacy container and safety cap made from a biodegradable material that is child resistant and elderly friendly. It would be desirable to have a pharmacy closure system that can be used to dispense human drugs, biological, nutraceutical and veterinary products, and at the same time meet standards developed by US Pharmacopeia and meets FDA container guidelines.

SUMMARY OF THE INVENTION

In one aspect of the present invention, a biodegradable pharmacy device includes a biodegradable material that includes a bioplastic resin and a plasticizer; a container that includes the biodegradable material, the container adapted to store medicine; the container having a first locking element on an exterior side of the container; a cap that includes the biodegradable material; the cap having a resilient inner member that engages with the container so as to form a seal; and the cap having a second locking element that cooperates with the first locking element so that the cap is safely held to the container.

In another aspect of the present invention, a pharmacy device includes a medical container, containing a bioplastic resin, having a plasticizer; a tamper-evident seal on the container; and a safety cap, containing the bioplastic resin and plasticizer, that seals the container; wherein the bioplastic is polylactic acid (PLA) or polyhydroxyalkonate (PHA); and the weight of the plasticizer is from 2 to 12% of the weight of the bioplastic.

In another aspect of the present invention, biodegradable pharmacy storage system includes a bioplastic resin that includes polylactic acid (PLA) or polyhydroxyalkonate (PHA); a biodegradable pharmacy container that includes the resin; and a pharmacy closure system that includes the resin, adapted to engage with the container so as to provide a well-closed container.

BRIEF DESCRIPTION OF THE DRAWINGS

FIG. 6 is a fragmentary elevation view of the embodiment of FIG. 1, to an enlarged scale and partly in section, with the cap locked on;

FIG. 12 is an exploded cross-sectional view of an embodiment of the cap of FIG. 10;

FIG. 13A is a side view of an embodiment of a tab and lug device according to the present invention;

FIG. 13B is a cross-section view of the embodiment of FIG. 13A;

DETAILED DESCRIPTION

Figure 1:
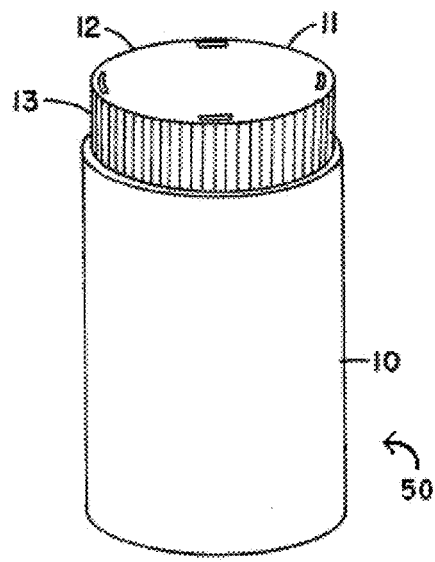
FIG. 1 is a perspective view of an embodiment of a bioplastic pharmacy device according to the present invention.

The preferred embodiment and other embodiments, including the best mode of carrying out the invention, are hereby described in detail with reference to the drawings. Further embodiments, features and advantages will become apparent from the ensuing description or may be learned without undue experimentation. The figures are not drawn to scale, except where otherwise indicated. The following description of embodiments, even if phrased in terms of "the invention," is not to be taken in a limiting sense, but describes the manner and process of making and using the invention. The coverage of this patent will be described in the claims. The order in which steps are listed in the claims does not indicate that the steps must be performed in that order.

The present invention generally relates to pharmacy containers that are made from bioplastic materials, and more specifically, to the combination of a biodegradable container and a biodegradable safety cap that seals the container for pharmaceutical purposes.

Embodiments of a bioplastic material may include a single, composite layer of bioplastic resin mixed with plasticizer. The plasticizer and resin may cooperate to form a bioplastic material that may be generally impermeable to fluids. The bioplastic resin may include PLA or PHA. Other embodiments may, for example, include PHB, PHBH, PBS, PBSA, PCL, PH, CPLA or PVA. The plasticizer may be a silicone such as, but not limited to, polydimethyl siloxane with filler and auxiliary agents, alkysilicone resin with alkooxy groups with filler and auxiliary agents and isooctyl trimethoxy silane or silicon oxide, and silicon dioxide. The bioplastic resin and silicone may be mixed to form a new resin. This resin may have been shown to have improved barrier properties, resulting in permeability rates to less than or equal to 0.5-25 units for water vapor, oxygen to 75-1400 units, and carbon dioxide 200-1800 units, measured; at g-mil/100 square inch per day for water at 100% RH, and cc-mill/100 sq inch day atm @ 20 degree Celsius and 0% RH for at 100% oxygen and carbon dioxide. This same resin may have water vapor permeability results that conform to US Pharmacopeia well-closed container requirements, and thus can be used for dispensing human drugs and biological products. These same containers may be used for veterinary dispensing. The US Pharmacopeia requirements are adopted by FDA and thus these containers may meet the FDA container guidelines.

Embodiments of a biodegradable medical container and cap may be constructed using any one or combination of the following or other processes:

A. adding plasticizers in 2 to 12% range (by weight) to a biodegradable resin to form a new polymer that may have permeability suitable for storing medicine; or B. lining a biodegradable resin with a membrane made of silicone hard coat resin or liquid rubber.

In an embodiment, using a biodegradable resin, a medical container is formed by blow molding a hollow perform, or is molded by extrusion injection process, and then finished into a container which has a desired appearance by blow molding such as direct blow molding, biaxial stretching blow molding, or extrusion, etc.

An embodiment may improve on the permeability of bioplastic resins, by adding plasticizers, including (but not limited to), polydimethyl siloxane with filler and auxiliary agents, alkysilicone resin with alko oxy groups with filler and auxiliary agents, isooctyl trimethoxy silane, silicon oxide, and silicon dioxide in the range of 2 to 12%. The plasticizers may be added to the bio plastic resin to form a biodegradable polymer, with improved barrier and permeability properties, to fluids, oxygen and carbon dioxide. The proportions of the plasticizers mixed could range from 2 to 12% total volume or weight. The ratio may be varied to the desired permeability and barrier properties to be attained, based the medicine to be stored (e.g. liquids, powders, or pills).

In embodiments, in order to improved gas barrier, a silicone hard coat resin or liquid rubber membrane may be applied, inside or outside to a structure that has already been formed with the biodegradable polymer or resin or paper.

In an embodiment, a silicone hard coat resin may be applied to the inside or outside of a bioplastic medical container and cap. Silicone hard coat resin has been found to yield a clear, marresistant film when applied to a suitably prepared bioplastic resin. The silicone hard coat may be applied by flow, dip, spin, or spray coating, and may utilize or require ultraviolet or electron beam curing. The hard coat may give primerless adhesion to paper and bioplastic resin that are cast, extruded, blow, stretch or injection molded. An embodiment of the resin may offer mar-resistance, high gloss, and protection from chemical attack.

An embodiment of a silicone hard coat resin may include, for example, a mixture of silicone 2% to 15% or acrylates 75% to 85% or both, and a curing agent including a photoinitiator or sensitizer or both. The thickness of an embodiment of a hard coat may be, for example, 5 nm to 80 nm. The acrylates may include, but are not limited to, tripropylene glycol diacrylate, trimethylolpropane triacrylate, ethoxylated trimethylolpropane triacrylate, hexamethylene diacrylate, bisphenol A diglycidyl ether diacrylate, aromatic urethane acrylate, alkoxylated hexanediol diacrylate, trifunctional acid ester acrylate, alkoxylated phenol acrylate, polyester acrylate, tricyclodene dimethanol diacrylate, and dipentaerythitol pentaacrylate. In embodiments, different or unique stability factors may be used in containers depending on the type of medicine to be stored in the container. A hard coat may be prepared around this stability factor using an acrylate such as, but not limited to, the acrylates mentioned above, and could include other epoxy, polyester, silicone, or urethane based acrylates.

An embodiment of a hard coat may include a mixture of silicone and/or acrylates, and a photo initiator and/or sensitizer with adhesion properties to work with bioplastic resins and paper, or other degradable containers. An embodiment of a hard coat may be applied to bioplastic resins, paper, or other degradable containers using ultraviolet or electron beam radiation curing methods. A resin may be utilized to coat the container, and when the resin is cured, the coating will become hard.

Embodiments of caps and container may be utilized to prevent easy opening by a child, but at the same time be elderly friendly. The container may be, for example, a container for medical pills or a vial such as a prescription vial for such pills or nutraceuticals (food products that provide health and medical benefits). An embodiment of the invention may include bioplastic or biodegradable resins such as, but not limited to, polylactic acid, PHA, PHBH, PHB/V, PHB, PBS, PBSA, PCL, PH, PLA, CPLA, or PVA+aliphatic polyester, or other biodegradable polymers. These elements may be made into a pharmacy container that has relatively rigid sides with good transparency. Embodiments may use these resins for rigid molded products, such as pharmacy containers and other containers. An embodiment may include a plasticizer such as, but not limited to, polydimethyl siloxane with filler and auxiliary agents, alkysilicone resin with alko oxy groups with filler and auxiliary agents and isooctyl trimethoxy silane or silicon oxide, and silicon dioxide.

An embodiment of a device for storing medicine or nutraceutical for both human and veterinary use may include a container and a regular or a child resistant safety cap.

An embodiment of a device for storing medicine may include a container and a safety cap. An embodiment of a safety cap may include a circumferential outer skirt and a circumferential, resilient, inner member. An embodiment of a container may have a rigid wall having an end for engagement with the cap internally of the cap's outer skirt, along a closure plane. The wall of the container may engage internally with the resilient inner member of the cap and expand the resilient inner member outwardly to provide a working seal of the container. The container and the safety cap may be bioplastic resin, and the resilient inner member may be bioplastic resin or another biodegradable, resilient material that could be used as a gasket to store medicine.

An embodiment may include a locking element disposed on the container and a cooperative locking element on the cap for preventing the cap from being removed from the container unless the locking element on the cap is depressed toward the container. In an embodiment, the cap cannot be removed unless the cap is pressed down onto the container and, while the cap is depressed, the cap is rotated relative to the container. In other embodiments, the cap cannot be removed unless a tab is depressed against the container and, while the tab is depressed, the cap is rotated.

An embodiment of a container may be used as a container, and may include locking elements for providing a tamper-evident seal, so that it will be obvious that the contents have been sealed with a material protecting the contents of the container. Penetration of the seal prior to the removal and destruction of the seal by the user will be evidence of the lack of integrity of the contents of the container. The cap may form a second seal, so that after the tamper-evident seal is removed, the medicine can still be stored under seal within the container.

An embodiment of a device for storing medicine or nutraceuticals may include a bioplastic container and cap that include a plasticizer such as silicon oxide added, plus an ultraviolet-cured coating to help permeability. The cap or container may include a resilient gasket to form a seal or near-seal that helps preserve the contents of the container, which might include medicine. The cap and container may include a safety member to help make the device child-safe. The cap may be safely held to the container, and may not easily be removed unless a child-safe action is taken, such as, but not limited to, depressing the cap onto the container or compressing a tab on the side of the cap.

Embodiments of a container and safety cap may be made from bioplastic materials namely, polylactic acid (PLA), polyhydroxyalkonate (PHA), poly 3 hydroxybutrate co 3 hydroxyhexanote (PHBH), and/or biopolymer poly-3-hydroxybutyrate (PHB). Plasticizers in 2 to 12% range (by weight) may be added to the bioplastic resin to help with permeability, thermal and impact strength.

A pharmacy closure device may include a safety cap and a container. Embodiments may be three closure types: Type A camming latch, Type B deflectable flexible member, and Type C tab and lug.

A camming latch embodiment of a safety cap may have a membrane which is disposed internally of the opening of the container along a wall, which is pressed downwardly and rotated until a container locking apparatus at the edge of the container and inside the cap engage each other to prevent opening the cap and container without depression of the cap and rotation of the cap on the container.

A deflectable flexible member embodiment may include a child-resistant package in which the safety container has an annular flexible or resilient member formed on the distal end of the neck of the container. The flexible member of the container may engage the cap so that there is a gradually increasing compression of the flexible member and the cap is rotated until locking elements on the cap engage locking elements on the container. The container may include elements disposed on the container and cooperative locking elements on the cap for preventing the cap from being removed from the container unless the cap is depressed on the container and rotated relative to the container.

A tab and lug embodiment of a safety cap may be reversible and may have dual functions, namely, child resistant and elderly friendly functions.

As depicted in FIG. 1, an embodiment of a device 50 may include a bioplastic container 10 and a bioplastic safety cap 11. The safety cap 11 may have a circumferential outer skirt 13 for engaging container 10 in a closure plane 12 to lock the container. Embodiments of a pharmacy container 10 and safety cap 11 may be made from bioplastics, namely, polylactic acid, polyhydroxyalkonate (PHA), poly 3 hydroxybutrate co 3 hydroxyhexanote (PHBH), and biopolymer poly-3-hydroxybutyrate (PHB), and may have a UV-cured coating.

Figure 2:
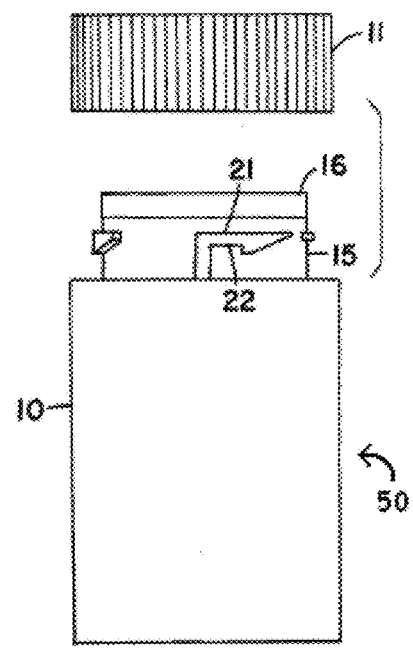
FIG. 2 is an elevation side view of an embodiment of the device of FIG. 1.

As depicted in FIG. 2, an embodiment of a bioplastic container 10 may include a rigid side wall 15 for engagement with the cap 11 internally of the outer skirt 13. Side wall 15 may have an end section 16 which fits within a resilient member of the cap 11 when the cap 11 is secured to the container 10. Cap removal prevention or other locking elements on the container may include a latch 21 having a receiving notch 22, adapted to engage with cooperating elements such as a lock lug in the cap.

Figure 3:
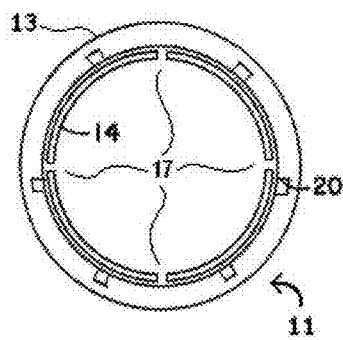
FIG. 3 is a bottom plan view of an embodiment of the cap of FIG. 1.

As depicted in FIG. 3, an embodiment of a bioplastic safety cap 11 may include a circumferential resilient member 14 that is spaced radially inwardly from outer skirt 13. The resilient member 14 may bend outwardly to provide a seal by the mating of the resilient member 14 of the cap 11 with the cooperating elements in the end section of the container. The resilient member 14 may include grooves 17 to allow the resilient member 14 to compress when the cap 11 is screwed on. Cap 11 may include lock lugs 20 adapted to cooperate with the latches and receiving notches on the container, to secure the cap 11 against the container. The resilient member 14 may be an inner bioplastic ring or membrane, spaced from and parallel to the outer skirt 13.

Figure 4:
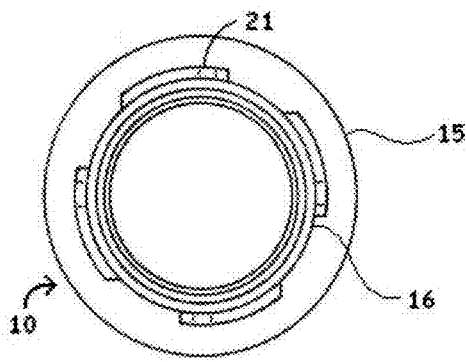
FIG. 4 is a top plan view of an embodiment of the container of FIG. 1.

As depicted in FIG. 4, an embodiment of a bioplastic container 10 may include latches 21 on the end section 16 of the side wall 15, adapted to cooperate with the lock logs in the cap and seal the container 10. The cap cannot be removed from the container 10 without depression of the cap onto the container 10 and rotation of the cap on the container 10, so that the lock logs may escape from the latches 21.

Figure 5:
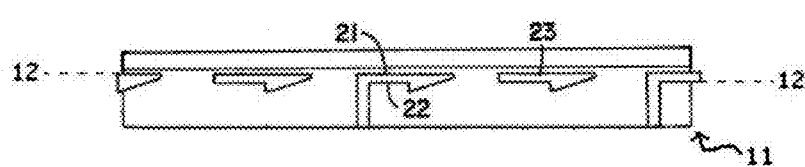
FIG. 5 is a developed view of an embodiment of a neck with locking elements of the container of FIG. 1.

As depicted in FIG. 5, an embodiment may include cap removal prevention elements that include a latch 21 having a receiving notch 22 on the container, and a lock lug 20 on the cap 11 which is guided into the notch 22 upon depression and rotation of the cap 11 on the container when the cap 11 is applied to close and seal the container along a closure plane 12.

Figure 6:
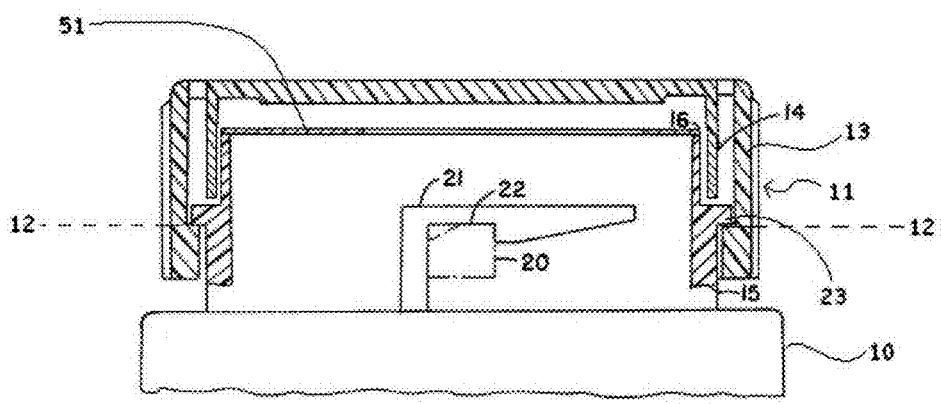

As depicted in FIG. 6, an embodiment may include lock lugs 20 in the cap, which may, for example, be of rectangular or tapered shape that seats in the notch 22 of the latch 21, so that the cap 11 is locked onto the container 10. Accordingly, the cap 11 cannot be removed from the container 10 merely by rotation of the cap 11, but the cap 11 must first be depressed on the container 10 to unseat the lock lug 20 from the notch 22 and then rotated in a counterclockwise direction so that the lock lug 20 can be positioned between the latch 21 and a next adjacent locking section 23. The cap 11 may then be removed by an upward motion. A tamper-evident seal 51 may be attached to end section 16 across the opening of the container 10.

Figures 7, 8:
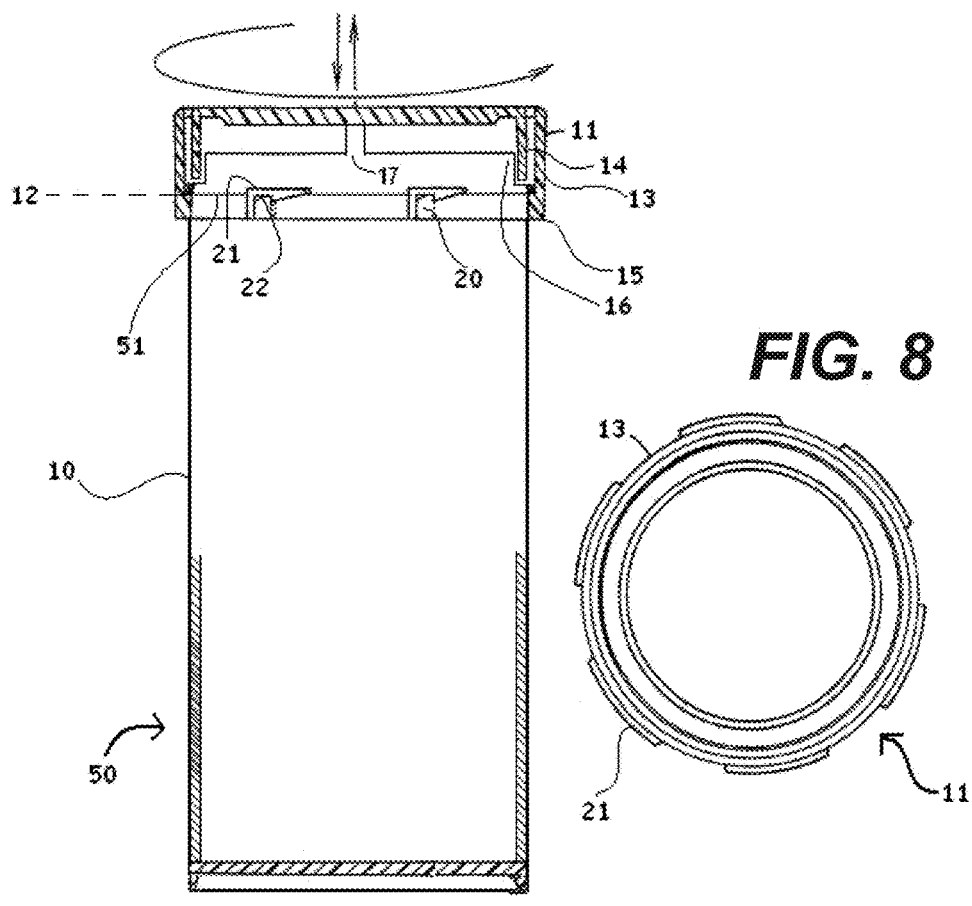
FIG. 7 is an elevation plan view, partly in section and partly fragmentary, depicting an embodiment of the present invention in use.
FIG. 8 depicts a top plan view of the embodiment of FIG. 7.

As depicted in FIG. 7, an embodiment of a device 50 may include a container 10 and a cap 11, which must be first depressed, then rotated, and then lifted in order to be removed.

As depicted in FIG. 8, an embodiment of a container 10 may include various numbers of latches 21, such as from 4 to 6, which correspond to a similar number of corresponding lock lugs in the cap.

Figure 9:
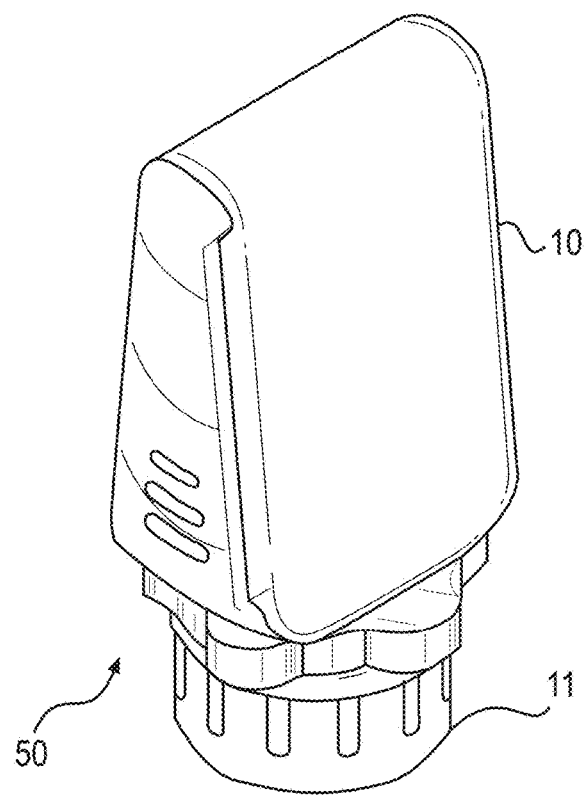
FIG. 9 is a perspective view of an embodiment of the present invention with the cap acting as the base and the container as the top.

As depicted in FIG. 9, an embodiment of a safety cap 11 may act as the base and the container 10 can be the top. The container and safety cap can be clear or of any color, but typical colors for the safety cap are white and container is amber, green or blue.

Figure 10:
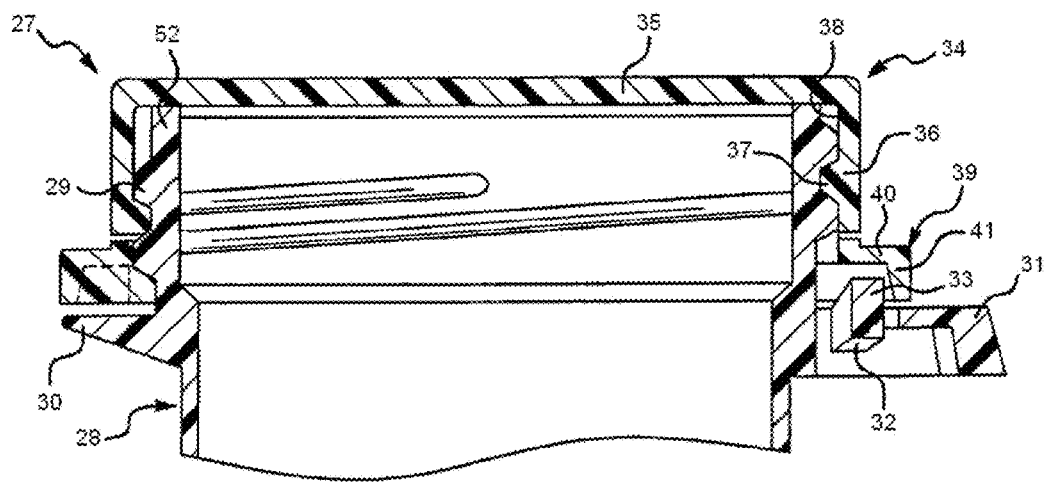
FIG. 10 is a partial cross-sectional view of an embodiment of the present invention.
Figure 11:
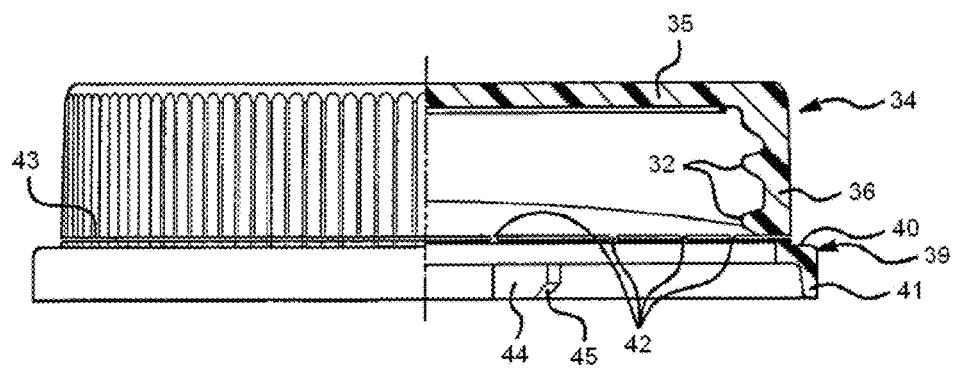
FIG. 11 is a cross-sectional view of an embodiment of the cap of FIG. 10.

FIGS. 10, 11, and 12 depict a child-resistant package 27 with an alternate safety cap and container top that may help prevent easy opening by a child. As depicted in FIG. 10, an embodiment of a child-resistant package 27 may include a cylindrical container 28, which has one or more surface manifestations or external threads 29 on a finish 52, and optionally has a radial flange 30 below the external threads 29. Other surface manifestations may be used, including bayonet features and the like. A child-resistant element, such as a deflectable tab or release element 31, may be formed on the container 28, preferably at a circumferential interruption or space in the radial flange 30. A generally permanent deflectable release element 31 may include an integral cantilevered stop element or lug 32 that extends axially upwardly from the release element 31. The cantilevered lug 32 may also extend generally circumferentially in the same direction as a downward threading spiral direction of the threads 29, and terminate in an axial stop surface 33.

As depicted in FIGS. 11 and 12, an embodiment of a safety cap 34 may include a one-piece integrally molded shell having a base wall 35 and a skirt 36 with one or more internal manifestations or threads 37. The axial edge of skirt 36 may be integrally connected i.e., as molded to a band 39. This integral connection may be a frangible connection, such as by a breakable circumferential array of frangible bridges 42. A child-resistant element, such as a locking lug 44, may extend axially downwardly from a ledge 40 of band 39 and radially inwardly from a band skirt 41. More than one locking lug 44 may be provided, but the quantity may correspond to the quantity of threads on the container finish 52 and closure skirt 36. The locking lug 44 also may also include a chamfered surface 45 to facilitate closure to the container 28. The safety cap 34 may be applied to container 28 by downwardly rotating the closure over the finish 52 of the container 28 so as to engage the threads 37 of the cap 34 with the threads 29 of the container 28. Before the cap 34 abuts the finish 52 of the container 28, the locking lug 44 may traverse freely over the cantilevered lug 32 so as to deflect the cantilevered lug 32 downwardly in the process. Once the locking lug 44 has deflected and passed over the cantilevered lug 32, the cantilevered lug 32 may snap back to its 5 original upwardly extending orientation. Thus, if one attempts to open the child-resistant package by rotating the cap 34 in an unscrewing or upward threading direction, the locking lug 44 may confront the axial stop surface 33 of the cantilevered lug 32 and thereby prevent the safety cap 34 from rotating any further. Accordingly, the safety cap 34 may not be removable from the container 28, unless the child 10 resistant feature is defeated. The child-resistant feature may be temporarily defeated by first depressing the release element 31 with a user's thumb or finger. Depressing the release element 31 in a radially inward and axially downward direction tends to pull the cantilevered lug 32 in an axial direction out of engagement or confrontation with the locking lug 44 of the safety cap 34. Once this is done, the safety cap 34 may be further rotated in the upward threading direction until the threads 15 37 of the safety cap 34 disengage from the threads 29 of the container 28 to remove the safety cap 34 and thereby open the container 28.

As depicted in FIG. 13A, an embodiment of a device 50 may include a bioplastic container 60 and a bioplastic reversible cap 62. The cap 62 may be dual sided, having a child resistant side and an elderly friendly side, each with its own set of threads to engage with the container. The child resistant side of the cap 62 may have a push button 64 on a child-resistant-side rim 66 that operates a locking tab 68 to provide a child resistant lock when the device is in a child-resistant orientation.

As depicted in FIG. 13B, an embodiment of a container 60 may have a tubular threaded top 70. When the device 50 is in a child-resistant, closed position, the cap 62 may sit on the container 60 so that reciprocal child-resistant-side threads 72 in the child resistant side of the cap 62 engage with the tubular threaded top 70. The top of the container 60 may further have a container skirt 74 with a lug 76, which cooperates with the locking tab 68 on the child-resistant-side rim 66 of the cap 62 to prevent retrograde rotation of the cap and provide child resistant lock. The elderly friendly side of the cap 62 may be opposite the child resistant side, and may have a flat top 78, and reciprocal elder friendly-side threads 80 located within the outer rim 82.

Figure 14E:
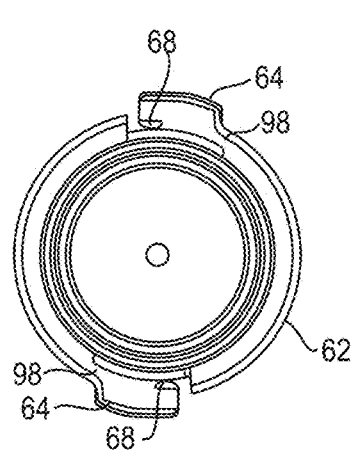
FIG. 14A is top view of the embodiment of a vial depicted in FIG. 13A.
FIG. 14B is a bottom of the embodiment of a cap depicted in FIG. 13A.
Figure 14F:
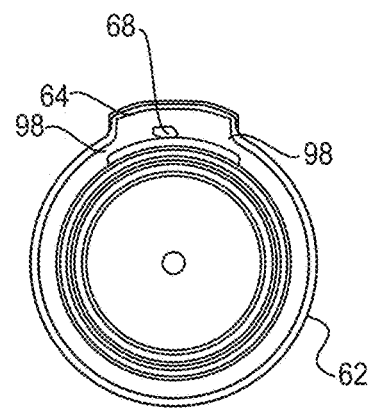

As depicted in FIGS. 14A and 14B, in an embodiment, the cap 62 may have a push button 64 that operates a locking tab 68, which cooperates with a lug 76 on a container skirt 74 of the container 60 to prevent retrograde rotation of the cap 62, thus to provide a child resistant lock.

Figure 15:
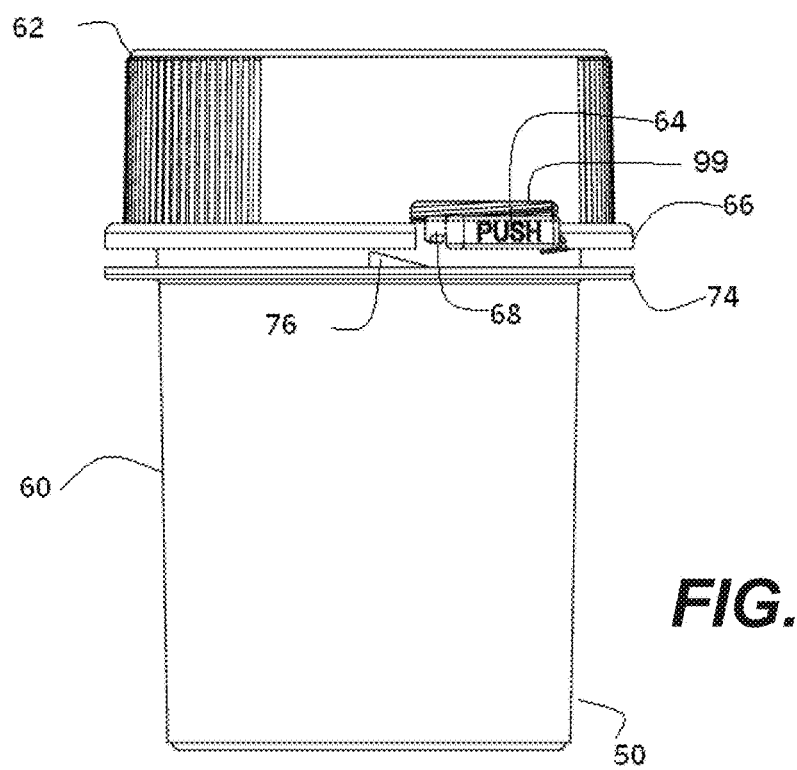
FIG. 15 and FIG. 15B show side views of the embodiment of a cap depicted in FIG. 13A.
Figure 15B:
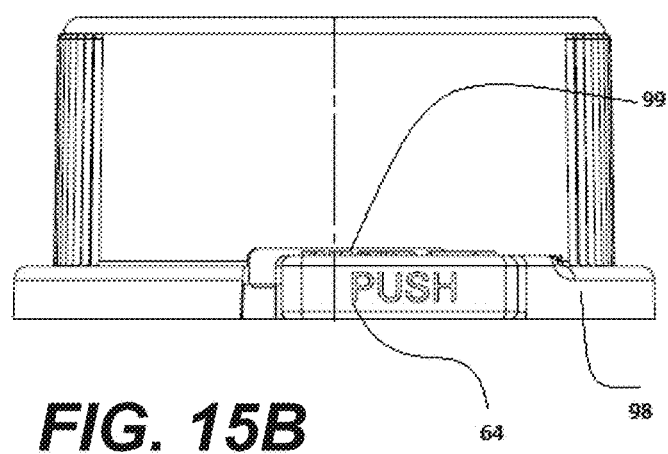

As depicted in FIG. 15 and FIG. 15B, in an embodiment, a push button 64 in the cap 62, when pushed inwards by an adult, may cause a locking tab 68 on the child-resistant-side rim 66 to disengage from a lug 76 on a container skirt 74 of the container 60, thereby allowing the cap 62 to be removed. The safety cap and top thread tolerances and the positions of the tab and lug may be shaped and positioned so the safety cap is turned onto the top at least to or somewhat beyond the locking position to achieve the safety cap and container closure. The diameter of the child-resistant-side rim 66 may be sufficiently greater than the diameter of the diameter of the container skirt 74 so that, when the cap 62 is screwed onto the container 60 to the locking position of further, the child-resistant-side rim 66 of the cap 62 forms a seal with the container skirt 74 on which is affixed the lug 76.

Figure 16:
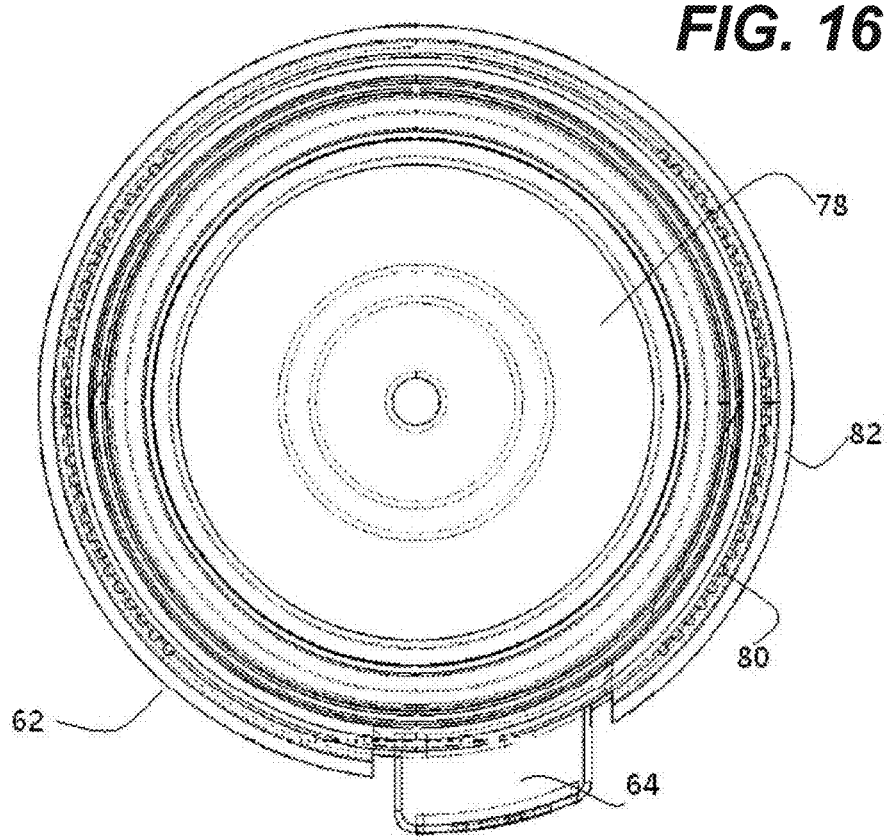
FIG. 16 is a top view of the embodiment of a cap depicted in FIG. 13A.

As depicted in FIG. 16, an embodiment of a reversible cap 62 may have an elderly friendly side with elder-friendly-side threads 80, positioned on the inside of the outer rim 82 of the cap 62. The elderly friendly side may have a central flat top 78, which engages with the tubular threaded top 70 of the container 60.

Figure 17:
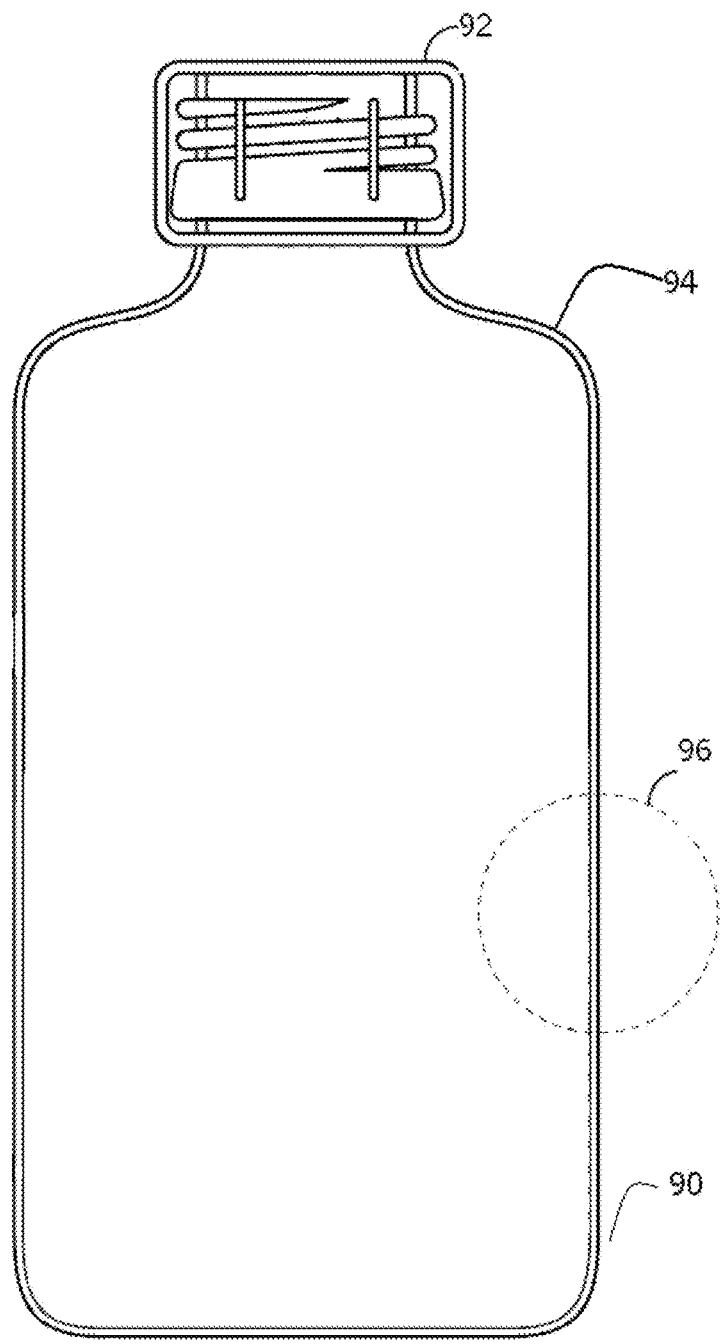
FIG. 17 is an embodiment of a pharmacy closure device with a cap and container according to the present invention.

As depicted in FIG. 17, an embodiment of a pharmacy closure device 90 may include a cap 92 and container 94. Embodiments of container walls 96 and the cap 92 may substantially consist of a bioplastic resin. Embodiments of a container wall 96 and the cap 92 may be coated on the outside or inside with a silicone hard coat resin.

Figure 18A:
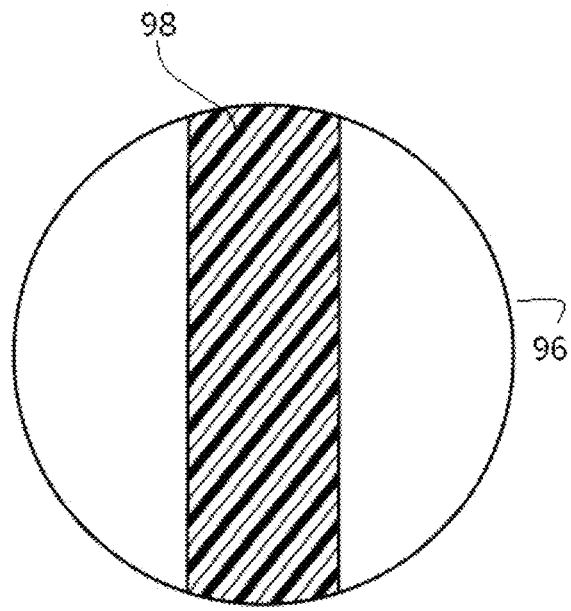
FIG. 18A is an embodiment of a wall of the pharmacy closure device depicted in FIG. 17.
Figure 18B:
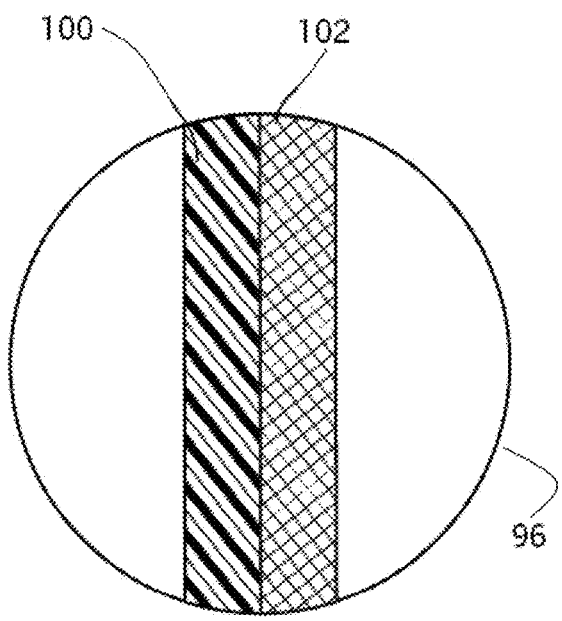
FIG. 18B is an alternate embodiment of a wall of the pharmacy closure device depicted in FIG. 17.

As depicted in FIG. 18A, an embodiment of a container wall 96 may consist substantially of a composite biodegradable resin 98, which may include silicone, acrylates, or both, and a curing agent that includes a photoinitiator or sensitizer. As depicted in FIG. 18B, an embodiment of a container wall 96 may include a biodegradable resin 100 that is coated on the outside or inside with a hard coat resin 102. The hard coat resin 102 may be made substantially of silicone, acrylates, or both, and a curing agent that includes a photoinitiator or sensitizer.

Embodiments of the shape of the containers and safety caps are not limited to the drawings and can be of variable sizes, shapes, and orientation.

I claim:

1. A pharmacy storage system comprising:
   a round, cylindrical container having a closed end and an open end;
   a round flange circumferentially disposed about the open end of the container with the flange being substantially parallel thereto, the flange having at least one locking lug;
   the container having a cylindrical side wall extending upwardly from the round flange, the side wall having threads that engage complentary threads of a cap to removably secure the cap to the container, and wherein the locking lug is positioned outward of and separate from the cylindrical side wall, and wherein the locking lug is define by four surfaces including:
   (i) an inward surface;
   (ii) an outward surface opposite the inward surface;
   (iii) a slanted surface that connects the inward surface to the outward surface and slants from the inward surface toward the outward surface so that the inward surface is longer than the outward surface;
   (iv) a V-shaped surface opposite the slanted surface and connecting the inward surface to the outward surface, wherein the V-shaped surface forms a notch; and
   a cap having an entirely circular outer circumference, wherein the cap engages the cylindrical side wall of the container, with the cap having at least one locking tab that cooperates with the at least one locking lug to secure the cap to the container by rotating the cap, wherein the at least one locking tab is flexibly joined to the cap with a push button to permit radial displacement, when engaging or disengaging the at least one locking lug, and wherein the locking tab forms a point that engages with and slides into the notch of the locking lug to prevent rotation of the cap relative to the cylindrical side wall of the container.

2. The pharmacy storage system of claim 1, wherein the at least one locking tab displaces radially inward or outward as the cap rotates past the at least one locking lug.

3. The pharmacy storage system of claim 1, wherein the at least one locking tab depresses radially inward to disengage from the at least one locking lug.

4. The pharmacy storage system of claim 1, wherein the at least one locking lug is cantilevered.

5. The pharmacy storage system of claim 1, wherein the cap further comprises an inner annular lip that seals against the open end of the container when the cap is fully engaged onto the container.

6. The pharmacy storage system of claim 1, further comprising a biodegradable material that includes a bioplastic resin and a plasticizer, wherein the proportion by weight of plasticizer to bioplastic resin in the biodegradable material is between 2 percent and 12 percent.

7. The pharmacy storage system of claim 6, wherein the bioplastic resin comprises between 80 percent and 95 percent PHA.

* * * * *